United States Patent Office 3,232,937
Patented Feb. 1, 1966

3,232,937
6-BENZYLMERCAPTOPURINES
George H. Hitchings, Yonkers, Gertrude B. Elion, Bronxville, and Irving Goodman, White Plains, N.Y., assignors to Burroughs Wellcome & Co. (U.S.A.) Inc., Tuckahoe, N.Y., a corporation of New York
No Drawing. Filed Aug. 2, 1962, Ser. No. 214,204
8 Claims. (Cl. 260—252)

This application is a continuation-in-part of United States patent applications, Serial No. 375,819, filed on August 21, 1953; Serial No. 533,886, filed on September 12, 1955; and Serial No. 853,682, filed on November 18, 1959, all of which are now abandoned.

The present invention relates to substituted 6-mercaptopurines. The analogous 6-mercaptopurine, described in U.S. Patent 2,697,709 has been definitely established as a drug useful in the treatment of leukemia and has been shown to be a useful inhibitor of cell division, particularly with regard to providing temporary remissions of acute leukemia. The main object of the present invention is to provide new compositions which modify the actions of these mercaptopurines so as to extend their range of usefulness. The use of both of the unsubstituted 6-mercaptopurines is somewhat restricted because of the limitations imposed by toxic side effects. It has now been found that certain S-substituted derivatives have a greater therapeutic index, including lower toxicity and, as a result, an extended range of usefulness. The compounds have been proven to have anticancer activity in rodents (note H. E. Skipper et al., Cancer Research, vol. 19, No. 4, pp. 425–37, May 1959).

Preferred compounds falling within the scope of the invention are selected from the class consisting of 2-amino-6-benzylmercaptopurines, 6-benzylmercaptopurines, 6-(o-nitrobenzyl)mercaptopurine and 2-amino-6-(p-nitrobenzyl)mercaptopurine.

The compositions of this invention may be formulated by the structure:

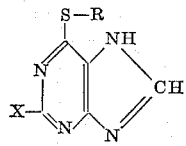

wherein X is selected from the class consisting of hydrogen and the amino group and R is a benzyl radical.

The invention likewise contemplates a novel process for the manufacture of the compounds of the above group in high yield.

The most useful method of preparation of these new derivatives is by the reaction of the mercaptopurine with the halide of the desired substituent radical in the presence of a suitable acceptor of the acid so formed. Accordingly, the aralkyl derivatives may be prepared (1) by the reaction of a benzylhalide with an alkali salt of thioguanine and (2) by the reaction of 2-amino-6-chloropurine with an alkali salt of a benzylmercaptan. The latter method is preferable when the benzyl group is substituted in the para position by a group such as methoxyl.

The following examples illustrate exemplary embodiments of the invention, its scope, however, is defined in the claims.

EXAMPLE 1

*6-benzylmercaptopurine*

To a solution of 17 g. of 6-mercaptopurine in 120 ml. of 2 N sodium hydroxide was added slowly, with stirring 12.6 ml. of benzylchloride. After two hours of stirring, the mixture was brought to pH 5 with acetic acid, chilled and filtered. The product, after recrystallization from water, melted at 188–189°.

The process of Example 1 may likewise be utilized for the preparation of the following additional compounds:

| Compound | M.P. | Solvent for recrystallization |
|---|---|---|
| 6-p-chlorobenzylmercaptopurine | 197–198° | 95% EtOH. |
| 6-o-chlorobenzylmercaptopurine | 199–200° | 30% EtOH. |
| 6-m-chlorobenzylmercaptopurine | 168° | 30% EtOH. |
| 6-m-nitrobenzylmercaptopurine | 198° | 30% EtOH. |
| 6-m-hydroxybenzylmercaptopurine | 233–236° | 30% EtOH. |
| 6-p-methylbenzylmercaptopurine | 143–144° | 30% EtOH. |
| 6-o-methylbenzylmercaptopurine | 184–186° | 30% EtOH. |

EXAMPLE 2

*2-amino-6-benzylmercaptopurine*

To a solution of 5 g. of thioguanine in 200 ml. of 0.4 N sodium hydroxide was added slowly, with stirring, 3.4 ml. of benzyl chloride. After four hours of stirring, the mixture was chilled, adjusted to pH 5 with 2 N hydrochloric acid and the precipitate filtered. The crude 2-amino-6-benzylmercaptopurine was recrystallized from aqueous acetone. The yield of purified material was 6 g., M.P. 205–7° dec. The ultraviolet absorption spectrum showed bands with maxima at 275 and 320 m$\mu$ at pH 1 and 315 m$\mu$ at pH 11.

EXAMPLE 3

*2-amino-6-(3',4'-dichlorobenzylmercapto)purine*

A solution of 4 g. of 2-amino-6-mercaptopurine in 48 ml. of 1 N sodium hydroxide was diluted with 50 ml. of water and 100 ml. of methanol. To this solution, at room temperature, were added gradually 4.62 g. of 3,4-dichlorobenzyl chloride and the mixture was stirred for six hours. The pH was adjusted to 5 by the addition of 2 N hydrochloric acid and the precipitate was collected by filtration. The 2-amino-6-(3',4'-dichlorobenzylmercapto)purine (5.6 g.) was recrystallized as needles, M.P. ca. 230° dec. The ultraviolet absorption spectrum of the product shows $\lambda$ max.=275, 320 m$\mu$ at pH 1 and $\lambda$ max.=315 m$\mu$ at pH 11.

EXAMPLE 4

*2-amino-6-(4'-chlorobenzylmercapto)purine*

A solution of 4 g. of 2-amino-6-mercaptopurine in 48 ml. of 1 N sodium hydroxide was diluted with 100 ml. of water and 150 ml. of methanol. To this was added slowly 3.75 g. of 4-chlorobenzyl chloride and the mixture was stirred at room temperature for eight hours. After the pH had been adjusted to 5 by the addition of 2 N hydrochloric acid, the mixture was chilled and filtered. The crude 2-amino-6-(4'-chlorobenzylmercapto)purine was recrystallized from 500 ml. of methanol, from which it precipitated as needles, M.P. 232–4° dec. (yield=4.2 g.). The ultraviolet absorption spectrum shows bands with maxima at 275, 320 m$\mu$ at pH 1 and 315 m$\mu$ at pH 11.

EXAMPLE 5

*2-amino-6-(2'-chlorobenzylmercapto)purine*

To a solution of 4 g. of 2-amino-6-mercaptopurine in 48 ml. of 1 N sodium hydroxide, 50 ml. of water and 75 ml. of methanol was added slowly 3.75 g. of 2-chlorobenzyl chloride. The mixture was stirred for four hours, then adjusted to pH 5 with 2 N hydrochloric acid and chilled. The crude 2-amino-6-(2'-chlorobenzylmercapto)

purine was collected by filtration and recrystallized from 300 ml. of aqueous methanol. The purified product (4.9 g.), M.P. 200° dec., shows ultraviolet absorption maxima at 275, 320 mμ at pH 1 and 315 mμ at pH 11.

The following additional compounds may be prepared by the foregoing procedures:

| Compound | M.P. | Solvent for recrystallization |
|---|---|---|
| 2-amino-6-(2'-methylbenzylmercapto)purine | 225–226° | MeOH. |
| 2-amino-6-(3'-methylbenzylmercapto)purine | 178–180° | Water. |
| 2-amino-6-(4'-methylbenzylmercapto)purine | 261–263° | 50% MeOH. |

EXAMPLE 6

2-amino-6-mercaptopurine

Five grams of 2-amino-6-benzylmercaptopurine were dissolved in 250 ml. of liquid ammonia. Small pieces of sodium were added with stirring, until the solution turned blue and remained that color for several minutes. The blue color, due to excess sodium, was discharged by the addition of a small amount of ammonium chloride and the solution was allowed to evaporate to dryness spontaneously. The residue was dissolved in 200 ml. of ether and 200 ml. of water and brought to a pH value of 9. The ether layer was removed and the aqueous layer brought to a pH value of 5 with acetic acid. Thioguanine (2.8 g.) precipitated and was collected.

What we claim is:
1. A compound of the formula

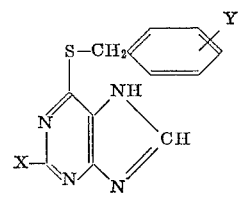

wherein X is selected from the class consisting of hydrogen and the amino group and Y is selected from the class consisting of halogen, lower alkyl, nitro, hydroxy and hydrogen.
2. 6-benzylmercaptopurine.
3. 2-amino-6-benzylmercaptopurine.
4. 6-p-chlorobenzylmercaptopurine.
5. 6-m-nitrobenzylmercaptopurine.
6. 6-o-methylbenzylmercaptopurine.
7. 6-(o-nitrobenzyl)mercaptopurine.
8. 2-amino-6-(p-nitrobenzyl)mercaptopurine.

References Cited by the Examiner

FOREIGN PATENTS 557,467   5/1958   Canada.

NICHOLAS S. RIZZO, *Primary Examiner.*

WALTER A. MODANCE, *Examiner.*